United States Patent [19]

Arima

[11] Patent Number: 5,250,248
[45] Date of Patent: Oct. 5, 1993

[54] APPARATUS AND PROCESS FOR MANUFACTURING A MOLDING

[75] Inventor: Hidetoshi Arima, Obu, Japan

[73] Assignee: Tokai Kogyo Kabushiki Kaisha, Obu, Japan

[21] Appl. No.: 865,182

[22] Filed: Apr. 8, 1992

Related U.S. Application Data

[62] Division of Ser. No. 695,982, May 6, 1991, Pat. No. 5,124,189.

[30] Foreign Application Priority Data

May 9, 1990 [JP] Japan .................. 2-119475

[51] Int. Cl.$^5$ .................. B29C 47/20
[52] U.S. Cl. .................. 264/171; 264/45.9; 264/173; 264/177.16; 264/209.8; 425/4 C; 425/131.1; 425/462
[58] Field of Search .............. 264/177.10, 171, 177.16, 264/177.17, 167, 173, 209.8, 45.9; 425/466, 467, 131.1, 133.1, 132, 462, 4 C

[56] References Cited

U.S. PATENT DOCUMENTS

| | | | |
|---|---|---|---|
| 4,613,178 | 9/1986 | Fujita | 264/171 |
| 4,888,146 | 12/1989 | Dandeneau | 264/173 |
| 4,960,375 | 10/1990 | Saito et al. | 264/177.16 |
| 5,059,375 | 10/1991 | Lindsay | 264/173 |
| 5,110,529 | 5/1992 | Arima | 264/209.8 |

FOREIGN PATENT DOCUMENTS

| | | | |
|---|---|---|---|
| 0040336 | 11/1981 | European Pat. Off. | 264/177.1 |
| 57-26023 | 2/1982 | Japan | 264/177.1 |
| 58-25936 | 2/1983 | Japan | 264/177.17 |
| 58-76244 | 9/1983 | Japan | 264/167 |

*Primary Examiner*—Jeffery Thurlow
*Attorney, Agent, or Firm*—Dennison, Meserole, Pollack & Scheiner

[57] ABSTRACT

A process and apparatus for manufacturing a molding including a portion formed of hybrid of hard rubber and sponge rubber. The process includes steps of introducing the hard rubber and the sponge rubber into a conduit through a plurality of first ports and a plurality of second ports positioned between the first ports, thereby to form hybrid of the hard rubber and the sponge rubber in which a plurality of hard rubber filaments are uniformly embedded in the sponge rubber, and extruding the hybrid from a extrusion opening to form the hybrid portion. The apparatus includes a flow conduit for forming the hybrid, the flow conduit communicating with a sponge rubber feed pipe through a plurality of first ports and communicating with a hard rubber feed pipe through a plurality of second ports positioned between the first ports.

4 Claims, 12 Drawing Sheets

APPARATUS AND PROCESS FOR MANUFACTURING A MOLDING

This is a divisional of copending application Ser. No. 07/695,982, filed May 6, 1991, now U.S. Pat. No. 5,124,189.

BACKGROUND OF THE INVENTION

The present invention relates to a molding and apparatus and process for manufacturing the same.

Figure 16:
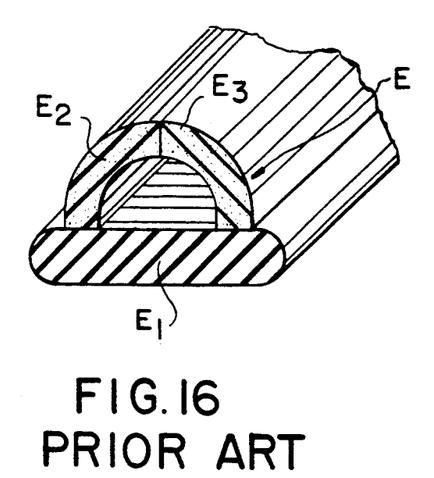
FIG. 16 is a fragmentary perspective view of a prior art molding.

Some of moldings for special purposes comprise three or more portions formed of different types of material. For example, as shown in FIG. 16, molding E comprises a first portion E1 formed of hard rubber, a second portion E2 formed of sponge rubber, and a third portion E3 formed of semihard rubber having a flexibility smaller than that of sponge rubber and greater than that of hard rubber. These portions E1, E2 and E3 are generally simultaneously and integrally formed as a unit.

A problem usually associated with such a molding E is that three types of rubber has to be prepared to form the molding E.

Another problem usually associated with the molding is that apparatus for manufacturing the molding has to include three special purpose machines to extrude hard rubber, sponge rubber and semihard rubber in order to form the molding E, thereby causing increased cost for the apparatus.

SUMMARY OF THE INVENTION

It is an object of the invention to provide a molding formed of only hard rubber and sponge rubber, but including three portions which are formed of hard rubber only, sponge rubber only, and hybrid of the hard rubber and the sponge rubber of which the flexibility is smaller than that of the sponge rubber and is greater than that of the hard rubber.

It is another object of the invention to provide a manufacturing process of the molding which is formed of hard rubber only, sponge rubber only, and hybrid of the hard rubber and the sponge rubber.

It is a further object of the invention to provide apparatus for manufacturing the molding suitable for practicing the process.

According to the present invention, there is provided a molding which comprises a portion formed of hard rubber, a portion formed of sponge rubber, and a portion formed of hybrid of the hard rubber and the sponge rubber.

According to the present invention, there is provided a process for manufacturing a molding which includes a portion formed of hard rubber, a portion formed of sponge rubber, and a portion formed of hybrid of the hard rubber and the sponge rubber, comprising the steps of providing a molding die having an extruding opening and at least three flow conduits communicating with the extruding opening, simultaneously feeding the hard rubber and the sponge rubber into the molding die, introducing a part of the hard rubber into the first flow conduit of the molding die and extruding the hard rubber from the extruding opening to form the portion formed of hard rubber, introducing a part of the sponge rubber into the second flow conduit of the molding die and extruding the sponge rubber from the extruding opening to form the portion formed of sponge rubber, and introducing the remainder of the hard rubber and the sponge rubber into the third conduit of the molding die to form hybrid of the hard rubber and the sponge rubber and extruding the hybrid from the extruding opening to form the portion formed of hybrid of the hard rubber and the sponge rubber.

According to the present invention, there is provided apparatus for manufacturing a molding which includes a portion formed of hard rubber, a portion formed of sponge rubber, and a portion formed of hybrid of the hard rubber and the sponge rubber, comprising a first feed pipe for feeding the hard rubber, a second feed pipe for feeding the sponge rubber, and a molding die having an extruding opening and at least three flow conduits communicating with the extruding opening, the first flow conduit communicating with the first feed pipe, the second flow conduit communicating with the second feed pipe, the third flow conduit communicating with both of the first and second feed pipes whereby hybrid of the hard rubber and the sponge rubber is formed in the third flow conduit when the sponge rubber and the hard rubber are fed from the first and second feed pipes.

An important feature of the present invention is that the molding is formed of only two types of rubber but includes three portions having different flexibility.

Another feature of the present invention is that the process provides a molding which is formed of two types of rubber but includes three portions having different flexibility.

A further feature of the present invention is that since the apparatus does not include the special purpose machine to extrude semihard rubber, the cost of the apparatus is remarkably decreased.

The present invention will become more fully apparent from the claims and the description as it proceeds in connection with the drawings.

DETAILED DESCRIPTION OF THE PREFERRED EMBODIMENT

Figure 1:
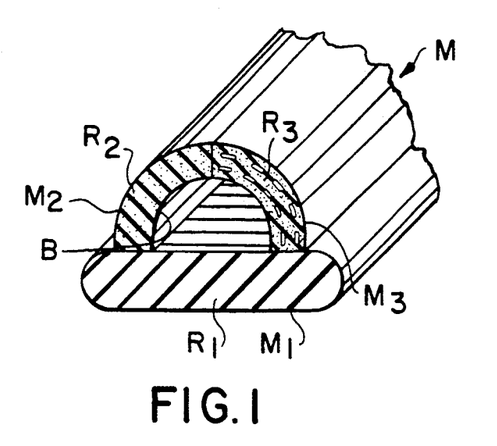
FIG. 1 is a fragmentary perspective view of a molding of the present invention.

As shown in FIG. 1, a hollow molding M according to the present invention comprises a first portion M1 formed of hard rubber R1, a second portion M2 formed of sponge rubber R2, and a third portion M3 formed of hybrid R3 of the hard rubber R1 and the sponge rubber R2 of which the flexibility is smaller than that of the sponge rubber R2 and is greater than that of the hard rubber R1. These three portions M1, M2, M3 are integrally formed as a unit. As will be appreciated, the second and third portions M2, M3 cooperate with each other to form a sectionally arcuate portion. The arucuate portion is connected to the first portion M1 to form a sectionally semicircular bore B therebetween.

Referring now to FIGS. 2 to 13, shown therein is apparatus for manufacturing the molding M.

Figure 2:
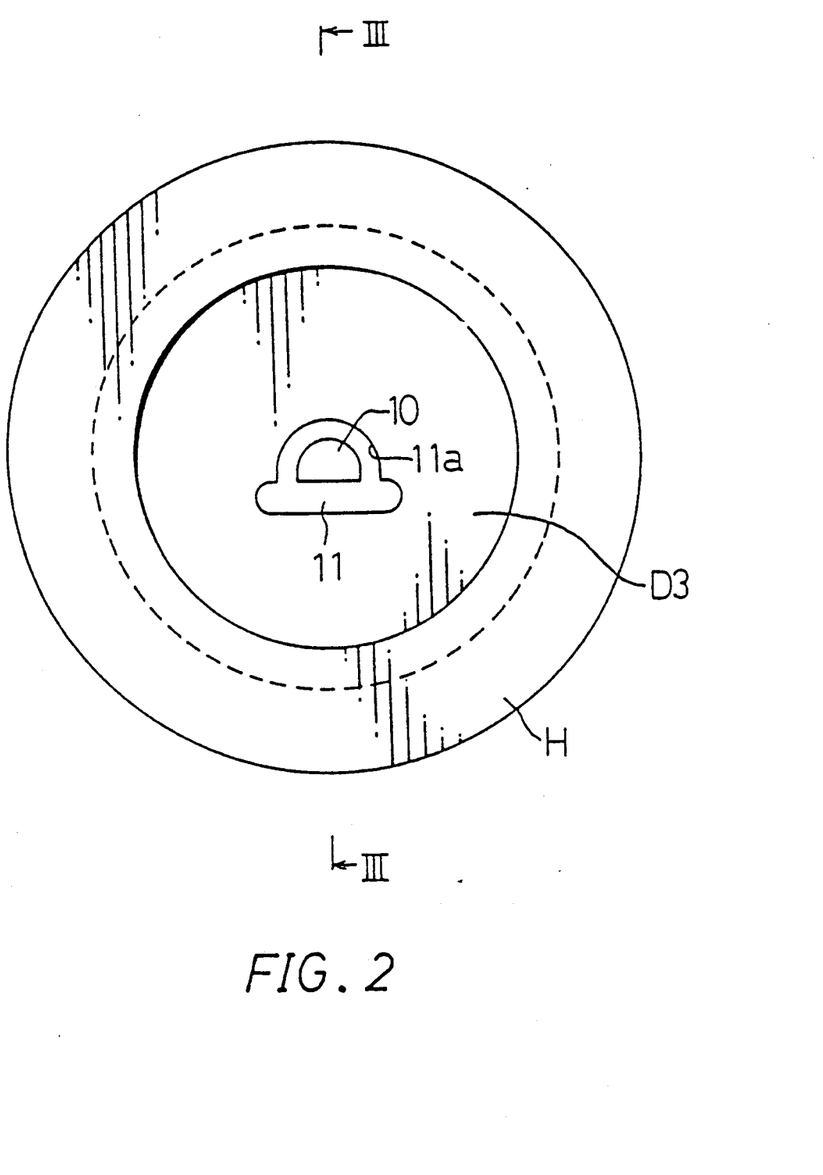
FIG. 2 is an elevational view of apparatus according to the present invention.
Figure 3:
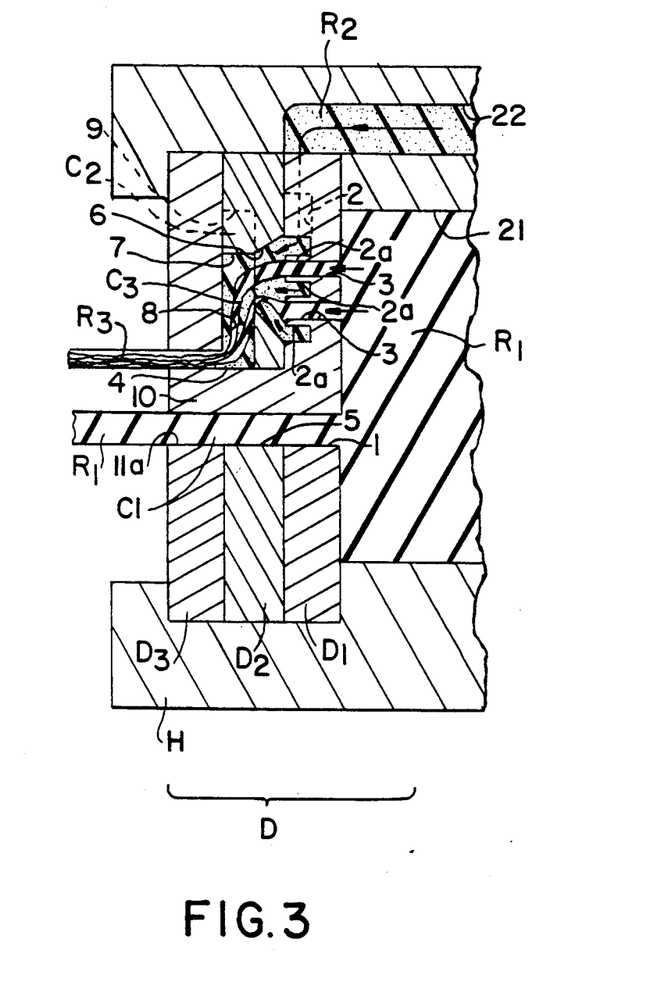
FIG. 3 is a sectional view taken along lines III—III of FIG. 2.

The apparatus includes a molding die D comprising a first disk-like molding die part D1, a second disk-like molding die part D2 and a third disk-like molding die part D3 which are closely positioned in this order.

Figure 4:
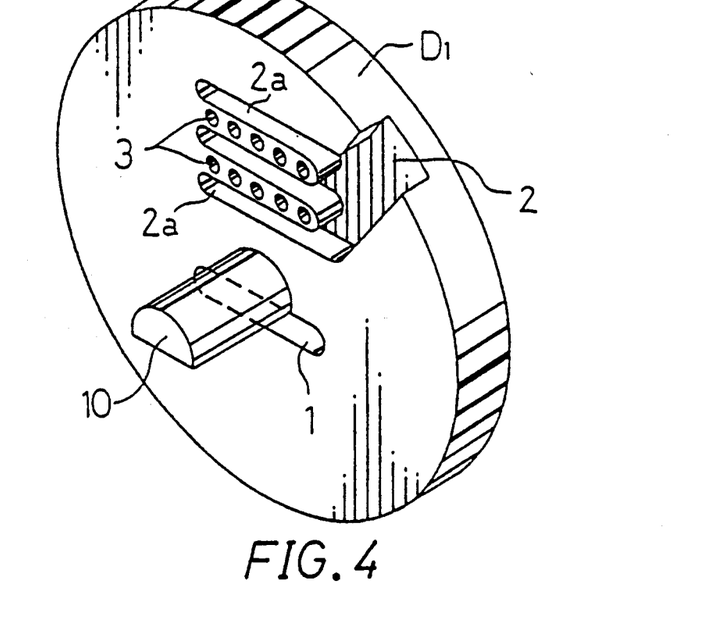
FIG. 4 is a perspective view of a first die part of the molding.
Figure 5:
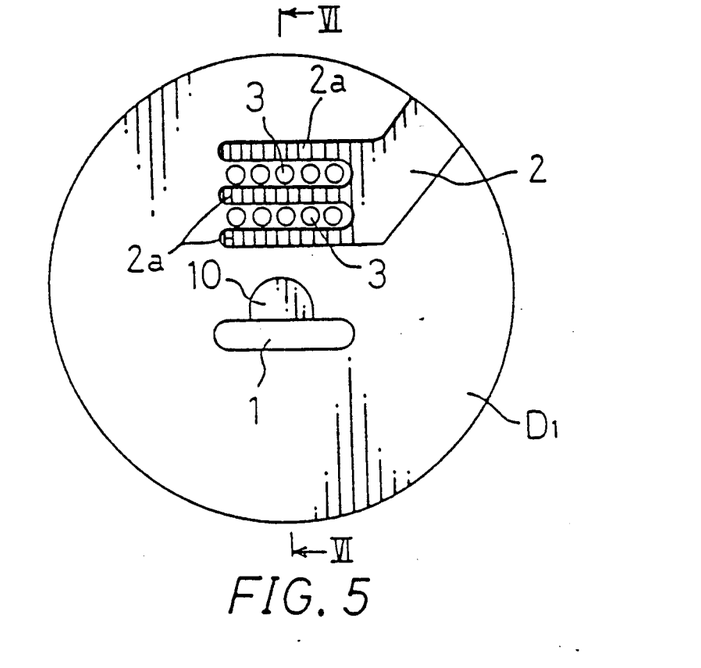
FIG. 5 is an elevational view of the first die part.
Figure 6:
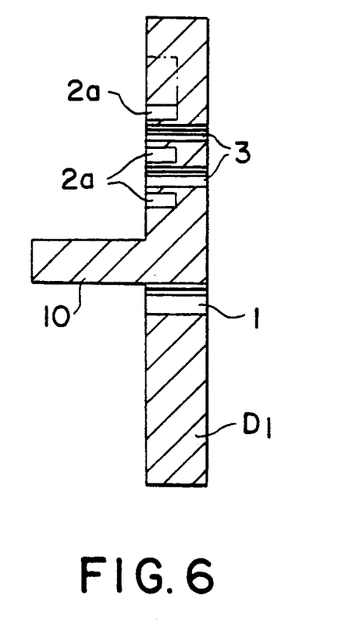
FIG. 6 is a sectional view taken along lines VI—VI of FIG. 5.

As shown in FIGS. 4 to 6, the first die part D1 is centrally formed with a long opening 1 through which the hard rubber R1 is to be supplied. The opening 1 is configured substantially to the sectional configuration of the first portion M1 of the molding M. The first die part D1 is also provided with a core member 10 which is positioned adjacent to the opening 1 and is forwardly projected from the front surface of the die part D1. The sectional configuration of the core member 10 is configured substantially to the sectional configuration of the bore B of the molding M. The upper position of the die part D1 is formed with a groove 2 through which the sponge rubber R2 is to be supplied. As best shown in FIG. 5, the groove 2 is branched to three thin grooves 2a. The die part D1 is also formed with a plurality of through holes 3 into which the hard rubber is to be introduced. The through holes 3 are arranged in two rows each of which is positioned between the thin grooves 2a.

Figure 7:
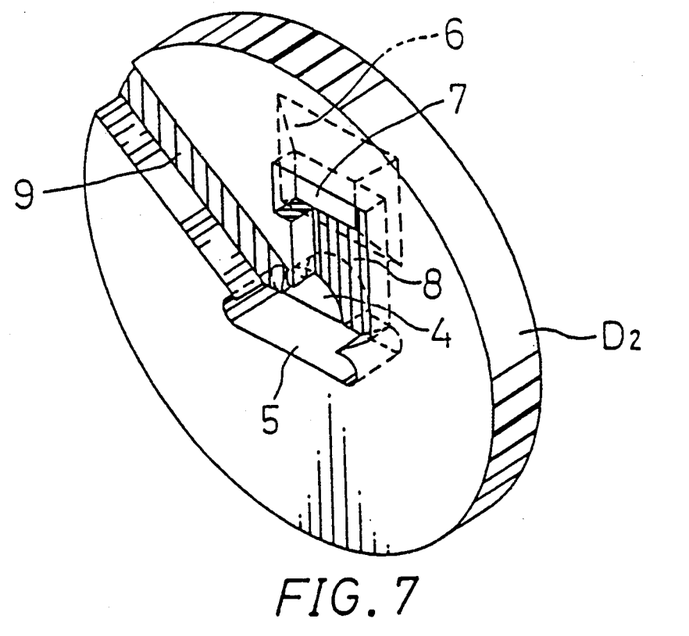
FIG. 7 is a perspective view of a second die part of the molding.
Figure 8:
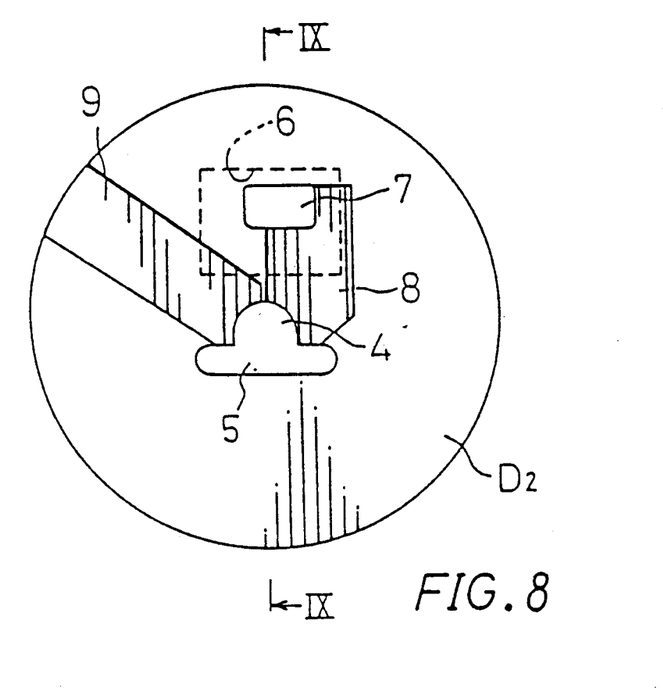
FIG. 8 is an elevational view of the second die part.
Figure 9:
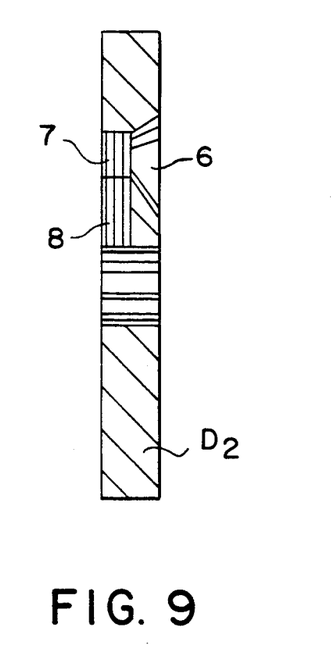
FIG. 9 is a sectional view taken along lines IX—IX of FIG. 8.

As shown in FIGS. 7 to 9, the second die part D2 is formed with an opening 4 which is adapted to closely receive the core member 10 therein. The die part D2 is also formed with an opening 5 which communicates with the opening 4 at the upper side thereof and has a configuration identical with that of the opening 1 of the first die part D1. The rear surface of the die part D2 is formed with a tapered recess 6 which is to be faced to the thin grooves 2a and the through holes 3 so as to receive the sponge rubber R2 and the hard rubber R1 supplied from the grooves 2a and the through holes 3. The front surface of the die part D2 is formed with a recess 7 which communicates with the tapered recess 6. The recess 7 communicates with the right half of the opening 4 through a guide recess 8 formed on the front surface of the die part D2. The front surface of the die part D2 is also formed with a groove 9 through which the sponge rubber R2 is to be supplied. The groove 9 communicates with the left half of the opening 4.

Figure 10:
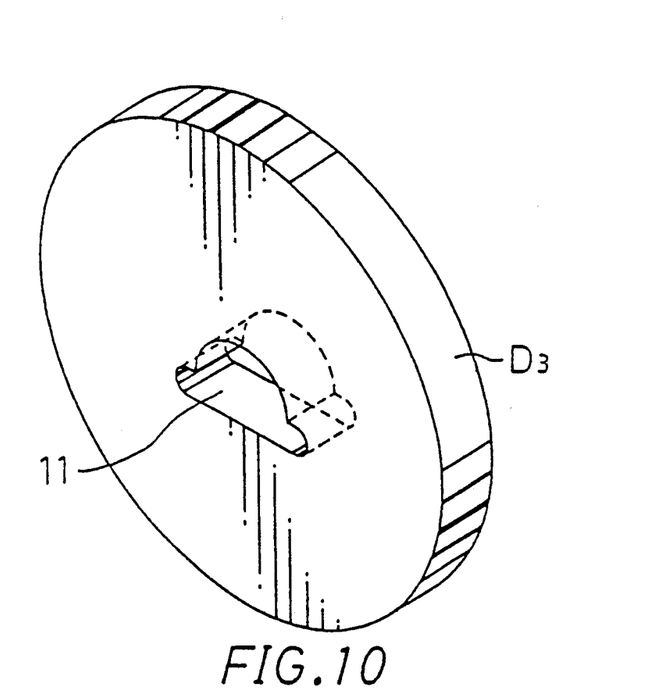
FIG. 10 is a perspective view of a third die part of the molding.
Figure 11:
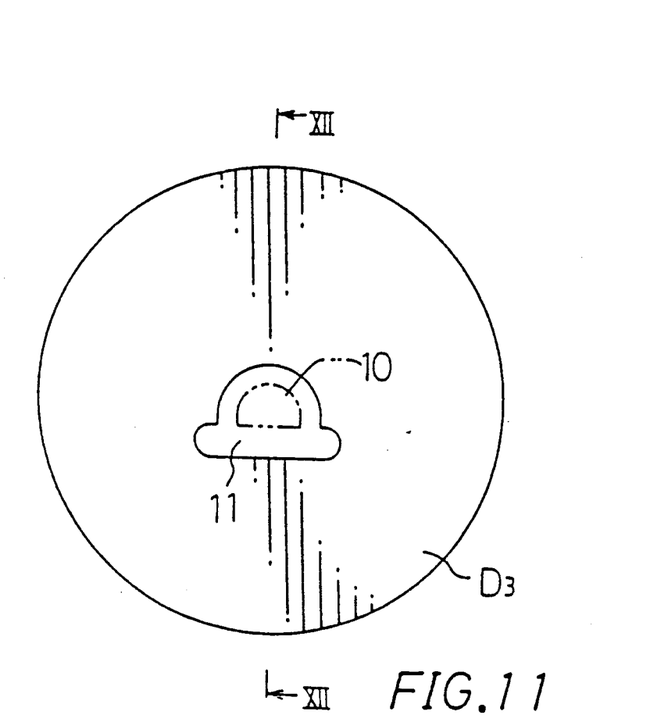
FIG. 11 is an elevational view of the third die part.
Figure 12:
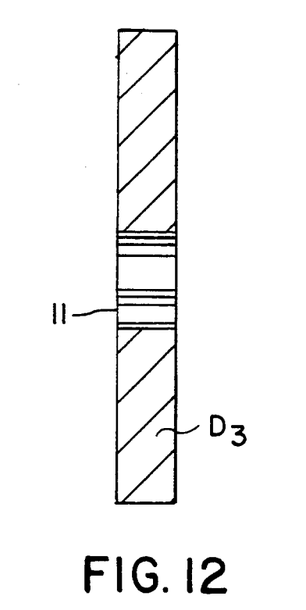
FIG. 12 is a sectional view taken along lines XII—XII of FIG. 11.

As shown in FIGS. 10 to 12, the third part D3 is formed with an opening 11 which is configured to conform substantially to the outer configuration of the molding M to be formed.

As shown in FIGS. 2 and 3, the die parts D1, D2, D3 are assembled in this order to form the molding die D, where the core member 10 is closely received with the opening 4 of the second die part D2 and is projected into the opening 11 of the third die part D3, thereby to form an annular extruding opening 11a which is configured to conform to the sectional configuration of the molding M. The molding die D is mounted on a head H of an extruder (not shown) to form the apparatus for manufacturing the molding M. The extruder includes a feed pipe 21 of the hard rubber R1 and a feed pipe 22 of the sponge rubber R2.

As best shown in FIG. 3, the opening 1 of the first die part D1 and the opening 5 of the second die part D2 cooperate to form a first flow conduit C1 which communicates with the feed pipe 21 to permit the hard rubber R1 to flow toward the extruding opening 11a. The groove 9 communicates with the feed pipe 22 and acts as a second flow conduit C2 for flowing the sponge rubber R2 toward the extruding opening 11a. Further, the tapered recess 6, the recess 7 and the guide recess 8 of the second die part D2 cooperate to form a third flow conduit C3 which communicates with both of the feed pipes 21, 22 through the through holes 3, the groove 2 and the thin grooves 2a, respectively, to permit the hard and sponge rubber R1, R2 to flow toward the extruding opening 11a.

The molding M is manufactured by the above-described apparatus.

In a typical operation to form the molding M, as shown in FIG. 3, the hard rubber R1 and sponge rubber R2 are simultaneously fed from the feed pipe 21, 22 and are distributed over the flow conduits C1, C2, C3. A part of the hard rubber R1 fed from the feed pipe 21 is introduced into the first conduit C1 and is directly extruded from the extruding opening 11a to form the first portion M1 of the molding M. A part of the sponge rubber R2 fed from the feed pipe 22 is introduced into the second conduit C2 and is directly extruded from the extruding opening 11a to form the second portion M2 of the molding M.

The remainder of the hard rubber R1 fed from the feed pipe 21 is introduced into the third conduit C3 through the through holes 3. Also, the remainder of the sponge rubber R2 fed from the feed pipe 22 is introduced into the third conduit C3 through the groove 2 and the thin grooves 2a. The hard and sponge rubber R1, R2 introduced into the third conduit C3 are effectively combined and are subsequently extruded from the extruding opening 11a to form the third portions M3 of the molding M.

Figure 13A:
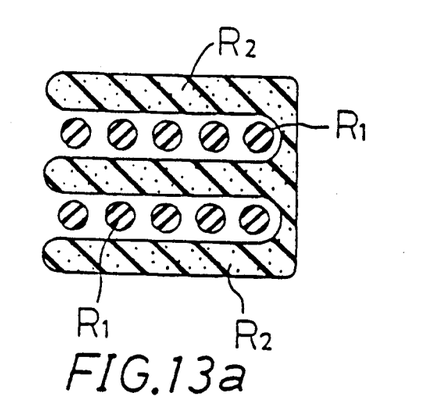
FIGS. 13a, 13b and 13c are views showing the process by which hybrid of sponge rubber and hard rubber is formed.
Figure 13B:
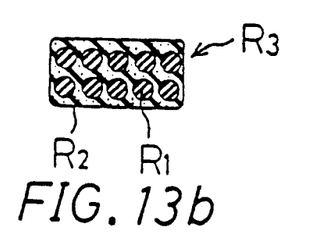
Figure 13C:
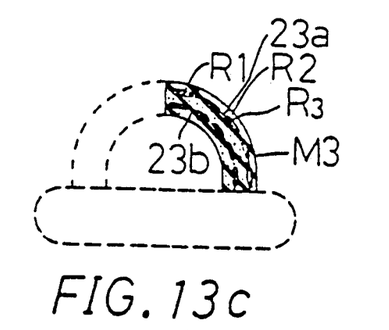

Since the through holes 3 and the thin grooves 2a are arranged in the manner described above, the hard and sponge rubber R1, R2 are introduced into the tapered recess 6 in two rows of stick-like form and in three layers of strip-like form, respectively, as shown in FIG. 13a. The hard and sponge rubber R1, R2 are gradually compressed in the tapered recess 6 and are advanced to the recess 7 where the rubber R1, R2 are formed to hybrid R3, as shown in FIG. 13b. Thereafter, the hybrid R3 is extruded from the extruding opening 11a through the guide recess 8 to form the third portions M3 of the molding M where the sectional configuration of the hard rubber R1 of the hybrid R3 is deformed along imaginary arcuate surfaces 23a, 23b concentrical with the arcuate surface of the third portion M3, as shown in FIG. 13C.

Thus, the molding M comprising the three portions M1, M2, M3 which are formed of three types of material R1, R2, R3, respectively, and which are integrally formed as a unit, is effectively formed in only one extruding process. Since the hard and sponge rubber R1, R2 are simultaneously fed from the feed pipes 21, 22, the three portions M1, M2, M3 are fixedly bonded to one another and the hard and sponge rubber R1, R2 of the hybrid R3 are also fixedly bonded to each other.

The preferred embodiment herein described can be modified, if required. For example, the configuration, the arrangement and the number of the thin grooves 2a and the through holes 3 can be modified to change the properties of the hybrid R3. According to the process of the present invention, a weather strip of an automobile can be easily formed.

Figure 14:
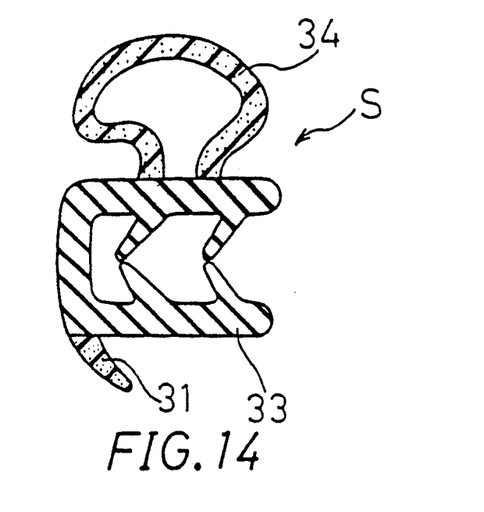
FIG. 14 is a sectional view of a weather strip of an automobile which may be formed by the process according to the present invention.
Figure 15:
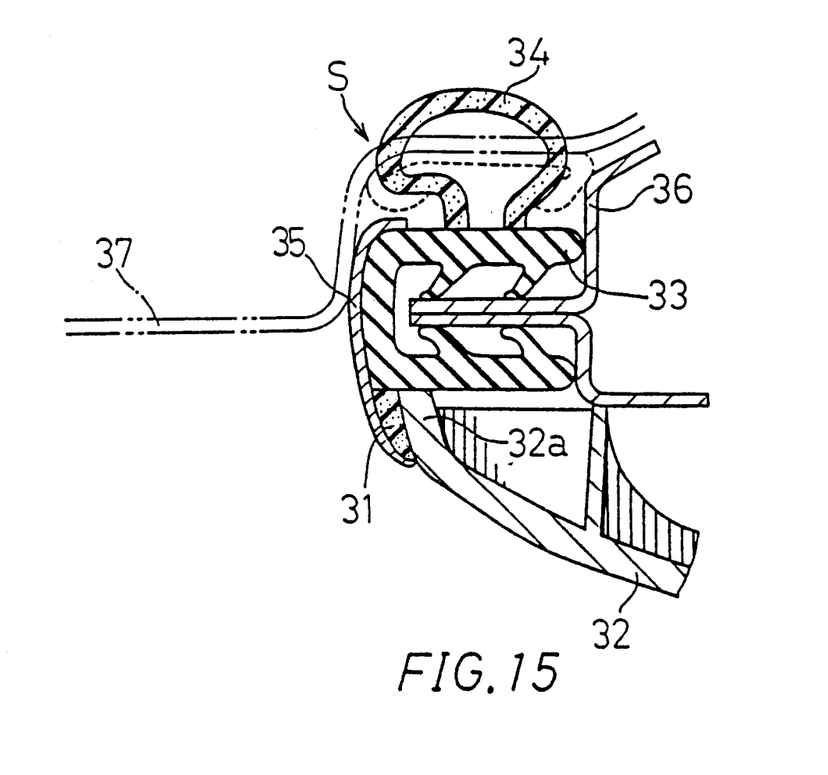
FIG. 15 is a sectional view of the weather strip mounted on an automobile body.

As shown in FIGS. 14 and 15, a weather strip S of an automobile mainly comprises an engagement member 33 which is to be mounted on an automobile body 36 and a tubular sealing member 34 which is to be contacted to an automobile door 37 when the door 37 is closed. These members 33 and 34 are formed of hard rubber and sponge rubber, respectively, and are integrally formed as a unit. The weather strip S generally includes a lip member 31 of which the lower surface is to be received with one end 32a of an interior decoration member 32. The lip member 31 is integrally formed to the engagement member 33. The lip member 31 is formed of hybrid of the hard rubber and the sponge rubber. Further, the numeral 35 shows an ornamental covering member having a color identical with that of the interior decoration member 32.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A process for manufacturing a molding including a portion formed of hard rubber, a portion formed of sponge rubber, and a portion formed of hybrid of the hard rubber and the sponge rubber, comprising the steps of, providing a molding die having an extrusion opening and at least three flow conduits communicating with said extrusion opening;

simultaneously feeding the hard rubber and the sponge rubber into said molding die;

introducing a part of the hard rubber into the first flow conduit of said molding die and extruding the hard rubber from said extrusion opening to form the portion formed of hard rubber;

introducing a part of the sponge rubber into the second flow conduit of said molding die and extruding the sponge rubber from said extrusion opening to form the portion formed of sponge rubber; and introducing the remainder of the sponge rubber and the hard rubber into the third conduit of said molding die through a plurality of first ports formed on said molding die and a plurality of second ports positioned between said first ports, respectively, thereby to form a hybrid of the hard rubber and the sponge rubber in which a plurality of hard rubber filaments are uniformly embedded in the sponge rubber, and extruding the hybrid from said extrusion opening to form the portion formed of hybrid of the hard rubber and the sponge rubber.

2. The process as defined in claim 1 further comprising the step of pressing the hybrid before extruding the hybrid from said extrusion opening.

3. Apparatus for manufacturing a molding including a portion formed of hard rubber, a portion formed of sponge rubber, and a portion formed of hybrid of the hard rubber and the sponge rubber, comprising:

a first feed pipe for feeding hard rubber;

a second feed pipe for feeding sponge rubber; and a molding die having an extrusion opening, at least three flow conduits communicating with said extrusion opening, a plurality of first ports and a plurality of second ports, the first flow conduit communicating with said first feed pipe, the second flow conduit communicating with said second feed pipe, the third flow conduit communicating with said second feed pipe through said first ports and communicating with said first feed pipe through said second ports, so as to form a hybrid of the hard rubber and the sponge rubber therein when the sponge rubber and the hard rubber are fed from said first and second feed pipes, said second ports being positioned between said first ports so that the hybrid is formed of material in which a plurality of hard rubber filaments are uniformly embedded in sponge rubber.

4. The apparatus as defined in claim 3, wherein said first ports are three long thin ports and wherein said second ports positioned between said first thin ports comprise a plurality of small through holes arranged in series whereby the hybrid is formed to a layered material in which the hard rubber is sandwiched in layers of the sponge rubber.

* * * * *